(12) United States Patent
Beckmann et al.

(10) Patent No.: US 7,975,107 B2
(45) Date of Patent: Jul. 5, 2011

(54) PROCESSOR CACHE MANAGEMENT WITH SOFTWARE INPUT VIA AN INTERMEDIARY

(75) Inventors: Bradford Beckmann, Redmond, WA (US); Bradley M. Waters, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 569 days.

(21) Appl. No.: 11/821,140

(22) Filed: Jun. 22, 2007

(65) Prior Publication Data

US 2008/0320235 A1 Dec. 25, 2008

(51) Int. Cl.
*G06F 13/00* (2006.01)
*G06F 12/02* (2006.01)

(52) U.S. Cl. .. 711/118; 711/122; 711/137; 711/E12.004

(58) Field of Classification Search .................. 717/150, 717/151, 160
See application file for complete search history.

(56) References Cited

U.S. PATENT DOCUMENTS

| | | | | |
|---|---|---|---|---|
| 4,991,088 | A * | 2/1991 | Kam | 717/160 |
| 5,732,242 | A * | 3/1998 | Mowry | 711/136 |
| 6,681,297 | B2 | 1/2004 | Chauvel et al. | |
| 6,851,010 | B1 | 2/2005 | Rao et al. | |
| 6,859,862 | B1 | 2/2005 | Liao et al. | |
| 6,886,085 | B1 * | 4/2005 | Shuf et al. | 711/159 |
| 6,931,488 | B2 | 8/2005 | Paulraj | |
| 7,039,766 | B1 * | 5/2006 | Smith | 711/137 |
| 7,055,003 | B2 | 5/2006 | Cargnoni et al. | |
| 7,114,035 | B2 | 9/2006 | Day et al. | |
| 7,168,070 | B2 | 1/2007 | Archambault et al. | |
| 7,200,713 | B2 | 4/2007 | Cabot et al. | |
| 2002/0116577 | A1 * | 8/2002 | Hursey | 711/118 |
| 2006/0168403 | A1 * | 7/2006 | Kolovson | 711/142 |
| 2006/0179250 | A1 | 8/2006 | Guthrie et al. | |
| 2007/0005894 | A1 | 1/2007 | Dodge | |
| 2007/0271416 | A1 * | 11/2007 | Ahmed | 711/133 |

OTHER PUBLICATIONS

Cettei, Kim Hazelwood, "Code Cache Management in Dynamic Optimization Systems", Date: May 2004, pp. 1-111.
Francesco, et al., "An Integrated Hardware/Software Approach for Run-Time Scratchpad Management", Proceedings of the 41st annual conference on Design automation, Date: 2004, pp. 238-243, ACM Press, New York, USA.
Lu, et al., "The Performance of Runtime Data Cache Prefetching in a Dynamic Optimization System", pp. 1-11.
Wong, et al., "Modified LRU Policies for Improving Second-level Cache Behavior", pp. 1-12.

\* cited by examiner

*Primary Examiner* — Matt Kim
*Assistant Examiner* — Sean Rossiter

(57) ABSTRACT

Software assists a processor subsystem in making cache replacement decisions by providing an intermediary with information regarding how instructions and/or data of a working set are expected to be used and accessed by the software. The intermediary uses this information along with its knowledge of system requirements, policy and the cache configuration to determine cache usage and management hints for the working sets. The cache usage and management hints are passed by the intermediary to the processor subsystem.

20 Claims, 3 Drawing Sheets

PROCESSOR CACHE MANAGEMENT WITH SOFTWARE INPUT VIA AN INTERMEDIARY

BACKGROUND

In this description and claims, a "working set" is abstractly defined to be a collection of instructions and/or associated data. For example, a working set could describe all instructions and data allocated by a particular process or thread, a particular data structure within a process's address space, or a thread's or process's most frequently accessed subset of instructions and data. A working set may belong, for example, to any of the following entities: a process, thread or fiber, or an application or service composed of multiple processes. In this description and claims, "entity" is defined as the container or owner of the working set.

As data and instructions are required by the processor of a computer, they are transferred from the main memory of the computer to the processor. The latency inherent in obtaining items from the main memory may be quite large. A cache is memory that is smaller and accessed more quickly by the processor than the main memory. The processor cache may be located on the chip with the processor, on the processor socket or elsewhere. A page is the unit of memory that is used in main memory management and allocation. Each page is composed of several cache lines, also known as "cache blocks", which are the units used in cache memory management. A failed attempt by the processor to access an item in its cache, known as a "cache miss", causes the item to be accessed from the main memory, which adds latency.

Applications running on the computer describe the location of data and instructions using virtual addresses that refer to a virtual address space. The operating system maps or translates the virtual addresses to corresponding physical addresses as needed. If the processor cache is a physically-indexed cache, a portion of the physical address, known as the cache index bits, is used to determine where the item will be copied to in the cache. Therefore, translation or mapping of a virtual address to a physical address by the Operating System implicitly selects the location in the cache where the page will be stored. Since the processor cache is smaller than the main memory and only a portion of the physical address is used as the cache index bits, several physical addresses will map to the same location in the cache.

Most processor caches are N-way set-associative caches. In an N-way set-associative cache, a page whose physical address has a given value of cache index bits can be stored in any of N locations in the cache. Likewise, a portion of the page corresponding to a single cache line can be stored in any of N locations in the cache. If all N cache lines in a set are occupied and the processor needs to write another item to that set, then one of the cache lines must be evicted to make room for the other item.

A cache replacement policy will determine which of the cache lines are evicted. Two common cache replacement policies are random cache replacement and Least Recently Used (LRU) or pseudo-LRU cache replacement. In a random cache replacement policy, cached items are randomly selected for eviction. In an LRU cache replacement policy, a cached item is selected for eviction when it has been unused for the longest time compared to other cached items in the set. Modified LRU policies have been proposed so that lines that exhibit temporal locality, i.e. that have a high probability of being reused in the near future, are not replaced as readily as those that do not appear to exhibit temporal locality. However, in general, hardware-only cache replacement algorithms are restricted by the hardware's limited view of workload behavior.

It has been proposed to allow software to include cache management instructions, namely prefetch, allocate and victimize instructions. A victimize instruction may be used to preempt the hardware's cache replacement policy by selecting a particular cached item for eviction notwithstanding the cache replacement policy. However, if the same software is to be run on different hardware having different cache sizes and/or configurations, it may be difficult for the software programmer to anticipate what cache management instructions to use in each case.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Over the years, the speeds of processors have increased significantly, while the speed of accessing main memory has not kept up the pace. A key to getting good performance and good efficiency from a system is to use processor caches, because they hide the latency of the main memory and enable processes and threads to be executed more quickly. However, when the instructions and/or data of processes and threads compete for the same cache capacity, cache misses can occur. In particular, if certain cache lines are repeatedly evicted, replaced with other information, and then reloaded with the same information that was previously evicted, this is known as "cache thrashing". When the frequency of this cycle significantly limits forward progress, performance is severely degraded and many of the benefits of using the processor cache are lost.

Some computer systems have multiple layers of processor caches. The lowest cache, e.g. the level 0 (L0) or level 1 (L1) cache, is the smallest and closest to the processor. The higher caches, e.g. the level 2 (L2) or level 3 (L3) cache, are larger and more distant from the processor. Some computer systems have more than one processor and/or more than one core in a processor. Two or more processors and/or processor cores may share a common cache, for example, the largest and most distant cache (which has the highest level).

Consider the example of an application that sequentially accesses a 2 MB working set multiple times within a loop. If the application runs alone on a single-core processor with a 1 MB processor cache, then assuming no hardware prefetching and a LRU cache replacement policy, the application will encounter cache misses for the entire working set because the processor cache will only contain the most recently used 1 MB of items and not the items that will be requested next. In this situation, a Most Recently Used (MRU) cache replacement policy would be more appropriate, because the processor cache will contain the first half of the working set and the application will encounter cache misses only for the second half of the working set. On the other hand, if the application runs simultaneously with other threads on a multi-core processor with a shared 4 MB processor cache, the best performing cache replacement policy is an LRU policy, because the 2 MB working set fits within the 4 MB shared cache. If other working sets already occupy the shared cache, an MRU replacement policy would prevent the application from using much cache capacity.

In one aspect of the described technology, by interfacing with an intermediary, software is able to assist the processor subsystem in making better cache usage and management decisions. The software may provide the intermediary with the size of the working set and its access behavior (i.e. the way in which the instructions and/or data of the working set are going to be accessed). The intermediary may use this information along with its knowledge of system requirements, policy and the cache configuration (including, for example, the layers and sizes of the cache), to determine dynamically cache usage and management hints for the working set. The intermediary may pass these cache usage and management hints to the processor, which has been extended to use these hints. By interfacing with the intermediary, the processor subsystem is able to receive the cache usage and management hints determined dynamically by the intermediary from its knowledge of system requirements, policy and the cache configuration and the information provided to it by the software.

In another aspect of the described technology, by interfacing with the intermediary, the processor subsystem is able to provide cache performance data to the software, which may allow software developers to better understand and optimize their program's cache utilization. It is proposed that processors will expand their performance monitoring features to track usage and performance events over subsections of the address space, as well as record a rich set of information when a performance event occurs. For example, processors may track usage and performance events, such as L1 and L2 cache accesses and cache misses. The usage and performance events may be tracked at any suitable granularity, ranging from cache-line to page to sets of pages. It is also proposed that when processors encounter a performance event interrupt, they may record the destination address of load and store instructions as well as enough information to determine the residency time of certain cache lines. Previously, processors only tracked cache performance events over the entire subsystem and when an event occurred, recorded at most the program counter and a subset of the register state. With the expanded performance monitoring capabilities proposed herein, software developers may understand their program's cache usage and behavior at the data structure level. Whereas the software may initially provide expected usage information for a working set, the processor subsystem is able to provide actual usage information, which is then passed to the intermediary and possibly also on to the software. Therefore software may perform data layout optimizations that were not previously possible. It is also contemplated that the processor subsystem could provide hints to the intermediary and to the software based on its observations of cache usage. Information accumulated by the software may influence or indicate to the processor subsystem what actions to take, including, for example, optimizing cache replacement, cache usage and allocation.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In this description, software is able to assist the processor subsystem of a computer system in making cache usage and management decisions. The software may provide an intermediary with information related to how instructions and/or data of a working set are expected to be used and accessed by the software. The intermediary has knowledge of system requirements, policy and the cache configuration for the processor subsystem. The intermediary uses this knowledge and the information provided by the software to dynamically determine cache usage and management hints for the working set. The intermediary provides these hints to the processor subsystem, which may consider the hints when managing the cache. The processor subsystem may track cache usage and performance events and provide the tracked information back to the intermediary and optionally to the software, so that there is feedback about the actual usage of the cache.

Although the following description involves caches that store instructions and data which are contained in a working set, it will be obvious to a person of ordinary skill in the art how to modify the described technology to generally apply to instruction caches and/or to data caches.

Figure 1:
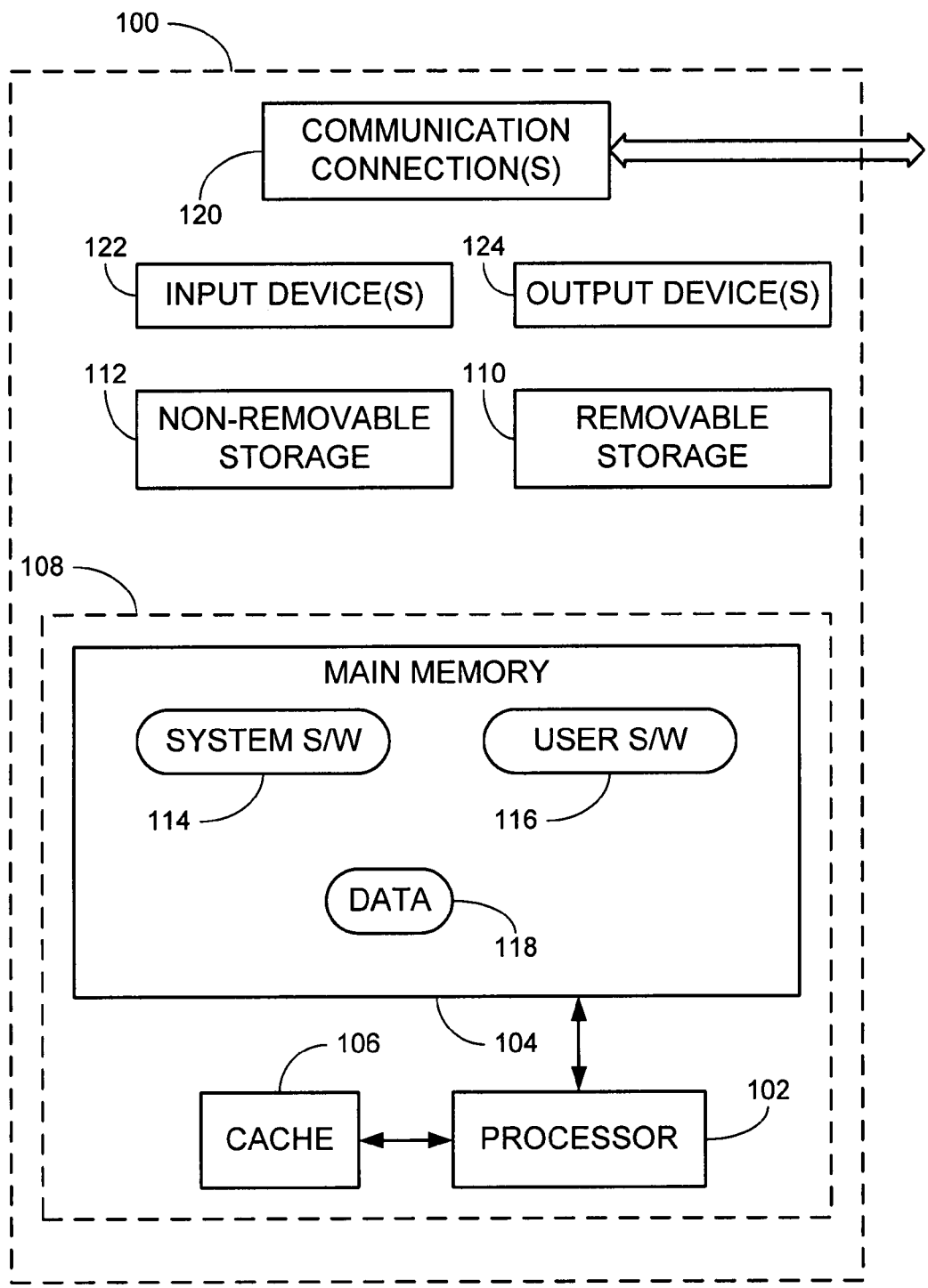
FIG. 1 is an illustration of an exemplary computer system.

FIG. 1 is an illustration of an exemplary computer system in which the described technology may be implemented. In its most basic configuration, a computer system 100 typically includes a processor 102, a main memory 104 and one or more processor caches 106. Depending on the exact configuration and type of computing device, main memory 104 may be volatile (such as random access memory (RAM)), non-volatile (such as read-only memory (ROM), flash memory, etc.) or some combination of the two. This most basic configuration is illustrated in FIG. 1 by a dashed line 108. It should be noted that the memory configuration may be non-uniform in terms of latency. More complex configurations, such as non-uniform memory architecture (NUMA) configurations, are also contemplated.

Computer system 100 may also include additional storage (removable and/or non-removable), including, but not limited to, magnetic or optical disks or tape. Such additional storage is illustrated in FIG. 1 by removable storage 110 and non-removable storage 112.

Information such as computer-readable instructions, data structures, program modules or other data may be stored in the physical computer storage media of computer system 100, which includes volatile and non-volatile, removable and non-removable media implemented in any method or technology. Programs and instructions that are to be executed by processor 102 and their associated data are stored in main memory 104, copied to main memory from the additional storage if necessary. For example, main memory 104 may store system software 114, user software 116 and their associated data 118. An operating system is an example of system software 114. Applications, guest operating systems, virtual machine managers and managed code environments are some examples of user software 116.

Physical computer storage media includes volatile and nonvolatile, removable and non-removable media implemented in any method or technology for storage of information such as computer-readable instructions, data structures, program modules or other data. Computer storage media includes, but is not limited to, RAM, ROM, electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium which can be used to store the desired information and which can be accessed by computer system 100. Any such computer storage media may be part of computer system 100.

Computer system 100 may also include communication connection(s) 120 that allow the computer system to communicate with other computer systems, networks and peripheral devices. Communication connection(s) 120 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. The term computer-readable media as used herein includes both physical computer storage media and communication media.

Computer system 100 may also comprise input device(s) 122 such as keyboard, mouse, pen, voice input device, touch input device, etc. Computer system 100 may also comprise output device(s) 124 such as a display, speakers, printer, etc. All these devices are well known in the art and need not be discussed at length here.

While FIG. 1 illustrates an example of a computer system that may implement the principles of the described technology, any computer system may implement the features of the described technology. In the description and in the claims, a "computer system" is defined broadly as any hardware component or components that are capable of using software to perform one or more functions. Examples of computer systems include desktop computers, laptop computers, Personal Digital Assistants ("PDAs"), telephones (both wired and mobile), wireless access points, gateways, firewalls, proxies, routers, switches, hand-held devices, multi-processor systems, microprocessor-based or programmable consumer electronics, network PCs, minicomputers, mainframe computers, embedded computing devices (e.g. computing devices built into a car or ATM (automated teller machine)) or any other system or device that has processing capability.

Those skilled in the art will also appreciate that the described technology may be practiced in network computing environments using virtually any computer system configuration. The described technology may also be practiced in distributed system environments where local and remote computer systems, which are linked (either by hardwired links, wireless links, or by a combination of hardwired and wireless links) through a network, both perform tasks. In a distributed system environment, program modules may be located in both local and remote memory storage devices.

Figure 2:
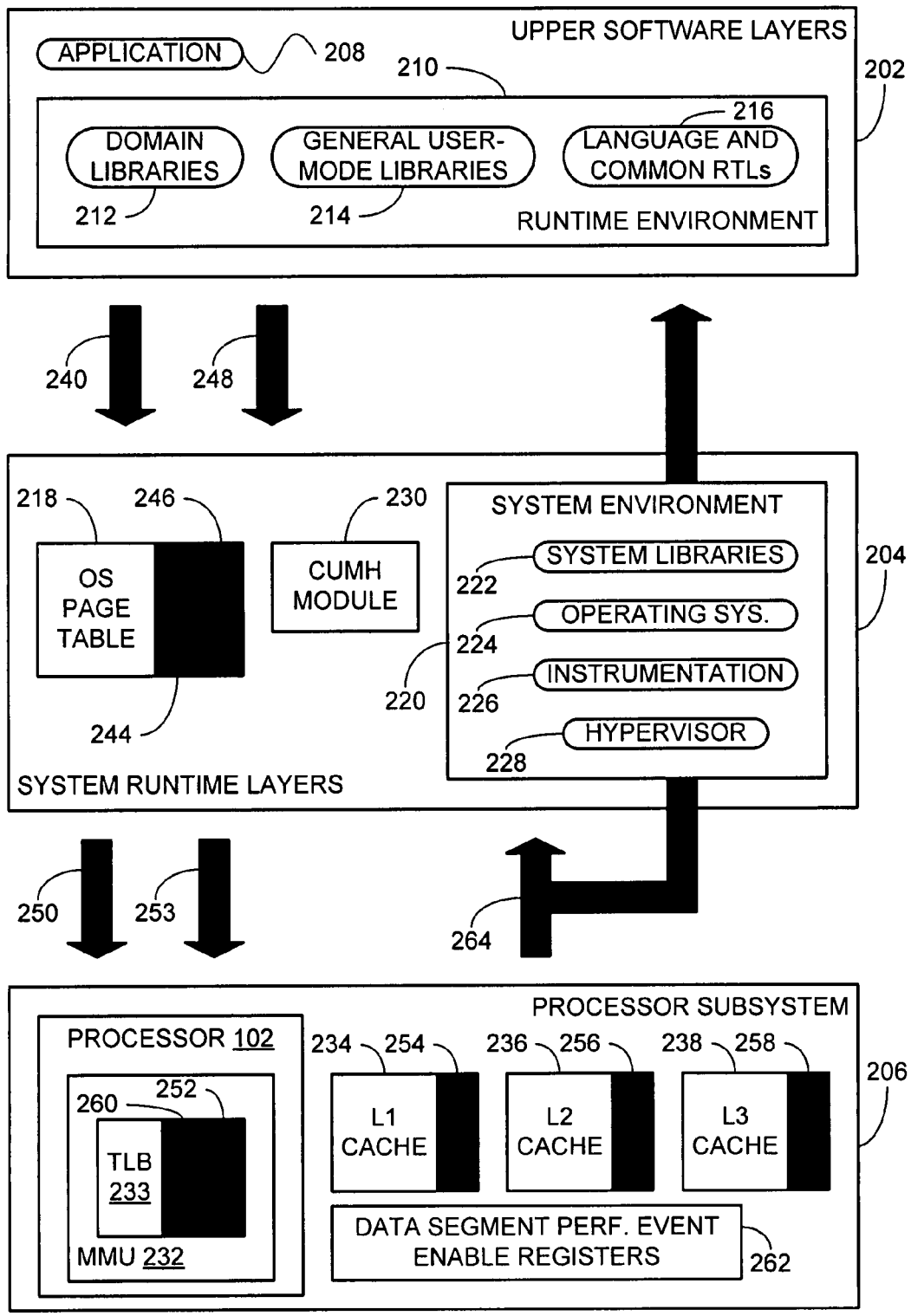
FIG. 2 is an illustration of an exemplary architecture for processor cache management.

FIG. 2 is an illustration of an exemplary architecture for processor cache management. The exemplary architecture involves upper software layers 202, system runtime layers 204, and a processor subsystem 206. One or more applications 208 in upper software layers 202 may be part of user software 116 or system software 114. A runtime environment 210 in upper software layers 202 comprises domain libraries 212, general user-mode libraries 214 and language and common runtime libraries (RTLs) 216.

As processes and/or threads and/or fibers of applications 208 and runtime environment 210 are executed by processor 102, working sets of those processes and/or threads and/or fibers are accessed by processor 102. A memory management and allocation module in the operating system maps virtual addresses of the working sets to physical addresses in main memory 104, and the mappings are stored in an operating system page table 218.

System runtime layers 204 also comprise a system environment 220, which comprises system libraries 222, an operating system 224, instrumentation 226 and, optionally, a hypervisor 228. System runtime layers 204 also comprise a cache usage and management hint (CUMH) module 230, the function of which is explained in further detail below.

A memory management unit (MMU) 232 in processor 102 performs the translations from virtual address to physical addresses. A translation lookaside buffer (TLB) 233 in MMU 232 is a cache of mappings from page table 218 and permits MMU 232 to perform certain translations faster than if the mappings were to be looked up in page table 218.

Processor subsystem 206 comprises an L1 cache 234, an L2 cache 236 and an L3 cache 238. The caches may all be located on the processor chip, or one or more of these caches may be located on the processor socket, on the printed circuit board that contains the processor socket, or elsewhere. It is contemplated that one or more of L2 cache 236 and L3 cache 238 are shared with other processors (not shown). It is also contemplated that there is no L3 cache, or that there are additional, larger caches.

When an application 208 allocates memory, it sends an allocation call 240 to operating system 224. Allocation call 240 includes the virtual location and size of the working set for which memory is being allocated. The format of a modified allocation call 240 may include an indication of an access behavior description (ABD) for the working set. Allocation call 240 forms part of the interface between upper software layers 202 and system runtime layers 204.

The indication of the access behavior description may be stored internally in system runtime layers 204 at the page level or at the cache-line level or at any other suitable level. For example, ABD values 244 may be stored in page table 218 in a manner similar to the storage of operating system-supported page-protection bits in page table 218.

CUMH module 230 may compute a cache usage and management hint (CUMH) for the working set, for example, using a low-priority process, based at least in part on the working set's size and access behavior description and based at least in part on the current cache hierarchy configuration (including, for example, size factors, constraints, which cache replacement policies can actually be implemented in the actual processor, etc.). An indication of the CUMH may be stored internally in system runtime layers 204 at the page level or at the cache-line level. For example, CUMH values 246 may be stored in page table 218 in a manner similar to the storage of operating system-supported page-protection bits in page table 218.

A new access behavior description call 248, which forms part of the interface between upper software layers 202 and system runtime layers 204, may specify an indication of an access behavior description (ABD) for a particular region of memory. System runtime layers 204 may intercept call 248 and update the indications of access behavior description stored internally at the page level or at the cache-line level for those pages and/or cache lines corresponding to the particular region of memory. CUMH module 230 may recompute the cache usage and management hints for the working sets corresponding to the particular region of memory, and may update the indications of the cache usage and management hints stored internally at the page level or at the cache-line level.

A non-exhaustive list of exemplary values for the access behavior description includes one or more the following values:
- MRU—the most recently used item of the working set will likely be the next item of the working set accessed;
- LRU—the least recently used item of the working set will likely be the next item of the working set accessed;
- MFU—the most frequently used item of the working set will likely be the next item of the working set accessed;
- LFU—the least frequently used item of the working set will likely be the next item of the working set accessed;
- Loop—the items of the working set are accessed within a loop, and for each iteration all accesses are within a window of a particular size (e.g. referenced data size, time, or other metric);
- Stream—the items of the working set are accessed within a window of a particular size (e.g. referenced data size, time, or other metric) until they are never accessed again;
- Repeatable pattern—the addresses within the working set are repeatedly accessed according to a specified pattern, which may be identified, for example, dynamically through feedback or using some other pattern identification scheme.

A non-exhaustive list of exemplary values for the CUMH includes one or more of the following values:
- LRU—replace the item using a cache replacement policy of LRU, pseudo-LRU or some other approximation of LRU;
- MRU—replace the item using a cache replacement policy of MRU, pseudo-MRU or some other approximation of MRU;
- Direct <L2, L3, Memory>—bypass the L1, L1&L2, L1&L2&L3 caches and store the item directly into the L2 cache, L3 cache or main memory, respectively; and
- Disallow <L3, L2&L3, L1&L2&L3>—do not allow the L3, L2&L3, or L1&L2&L3 caches, respectively, to store the item.

If the access behavior description of a working set is MRU, specifying that the most recently used item of the working set is likely to be accessed next, then a CUMH of LRU may be appropriate so that the least recently used item is evicted from the cache before the more recently used items are evicted. For example, when an application is manipulating a tree data structure, the top-level nodes will be accessed more often than the nodes lying on the lower branches. To ensure the frequently accessed top-level nodes remain in the cache, the application will specify MRU access behavior for the addresses storing the tree. Subsequently, the processor subsystem will evict the LRU cache lines because these cache lines are not likely to contain top-level nodes.

If the access behavior description of a working set is LRU, specifying that the least recently used item of the working set is likely to be accessed next, then a CUMH of MRU may be appropriate so that the most recently used item is evicted from the cache before the less recently used items are evicted.

By default, when a processor or processor core requests an address, the processor places the item referenced by the address within the core's smallest and closest L1 cache. The Direct CUMH overrides this default policy, and instructs the processor cache to place the requested item directly into the further L2 cache, L3 cache, or main memory location. This hint may be useful when CUMH module 230 identifies that a working set will not fit within a smaller cache but will fit within a larger cache. Associating this hint with the working set prevents the working set from evicting other useful items from smaller caches that won't benefit from storing the working set.

By default, when a processor evicts a cache line from a smaller and closer cache, the processor stores the cache line within its next larger cache which is usually has longer latency and is therefore slower to access. This default policy is usually advantageous because it keeps frequently requested cache lines in the closer caches that can be accessed more quickly. However, sometimes programmers are able to identify that a working set has limited usage after which it will never be used again. In such cases, allowing a working set to trickle into the larger caches may be a misuse of cache capacity if the working set will not be accessed during the time it resides in the cache. The Disallow CUMH may prevent the processor from devoting cache capacity to working sets that the software knows will no longer be used.

Figure 3:
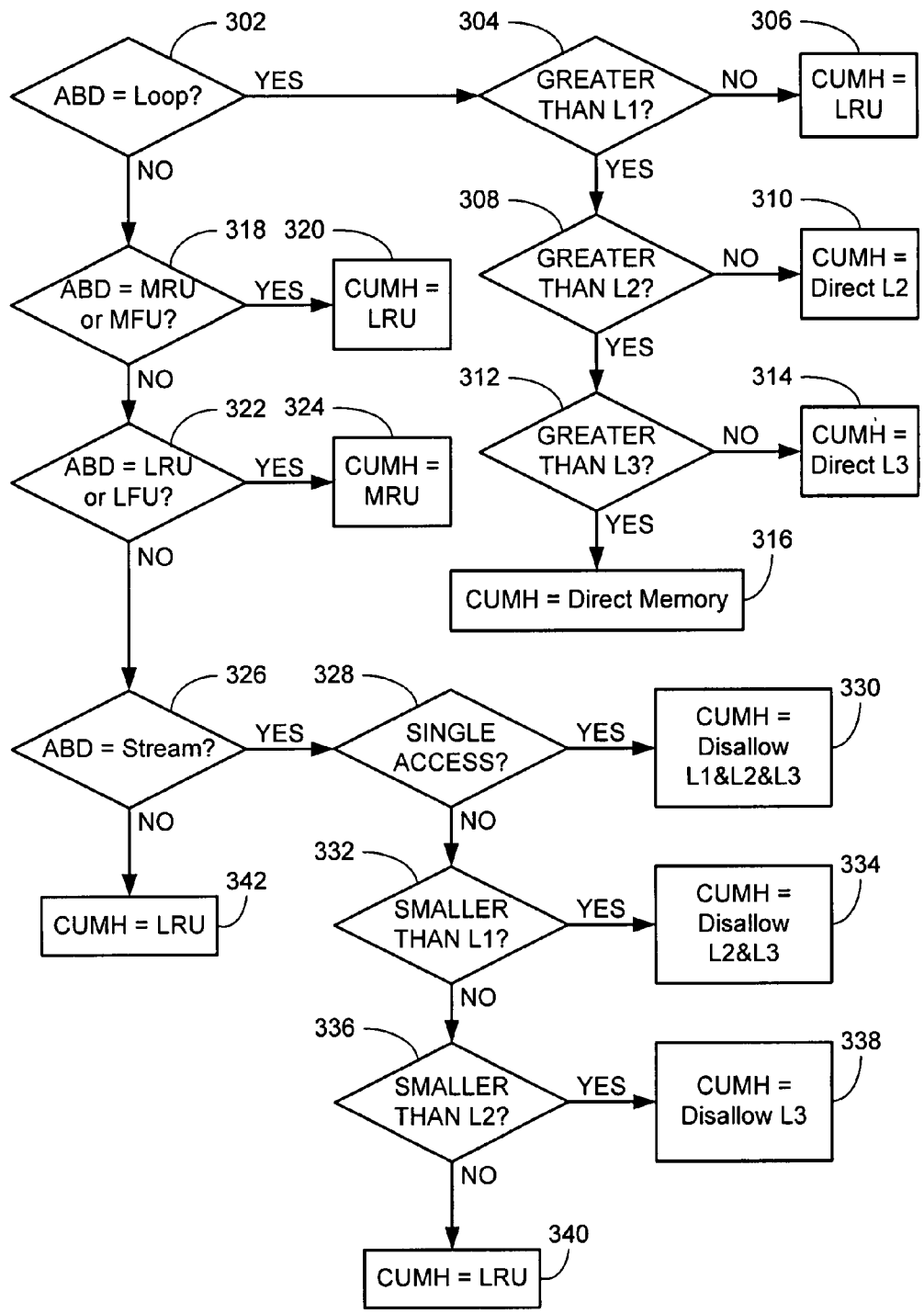
FIG. 3 is a flowchart of an exemplary method for determining cache usage and management hints.

FIG. 3 is a flowchart of an exemplary method for determining cache usage and management hints. This method may be implemented by CUMH module 230.

If the access behavior description for a working set is Loop, as checked at 302, then the size of the window within which all accesses occur in each iteration is compared to the sizes of the various caches. If the window size is not greater than the size of the L1 cache, as checked at 304, then the CUMH is LRU, as indicated at 306. If the window size is greater than the size of the L1 cache but is not greater than the size of the L2 cache, as checked at 308, then the CUMH is Direct L2, as indicated at 310. If the window size is greater than the size of the L2 cache but is not greater than the size of the L3 cache, as checked at 312, then the CUMH is Direct L3, as indicated at 314. If the window size is greater than the size of the L3 cache, then the CUMH is Direct Memory, as indicated at 316.

If the access behavior description for the working set is MRU or MFU, as checked at 318, then the CUMH is LRU, as indicated at 320. If the access behavior description for the working set is LRU or LFU, as checked at 322, then the CUMH is MRU, as indicated at 324. Since no MFU or LFU cache replacement policies currently exist, this method proposes that MFU access behavior descriptions be treated the same as MRU access behavior descriptions, and that LFU access behavior descriptions be treated the same as LRU access behavior descriptions. However, if in the future hardware algorithms can identify frequently used items, recently-used access behavior may be treated differently than frequently-used access behavior.

If the access behavior description for the working set is Stream, as checked at 326, then other characteristics of the access behavior and working set are also checked. If each item of the working set is accessed only once, as checked at 328, then the CUMH is Disallow L1&L2&L3, as indicated at 330, since there is no reason to cache an item that will not be accessed again. Otherwise, the size of the window within which an item is accessed is compared to the sizes of the various caches. If the window size is smaller than the L1 cache, as checked at 332, then the CUMH is Disallow L2&L3, as indicated at 334, because the items are likely to be accessed while in the L1 cache and are unlikely to be accessed after being evicted from the L1 cache. If the window size is not smaller than the L1 cache but is smaller than the L2 cache, as checked at 336, then the CUMH is Disallow L3, as indicated at 338, because the items are likely to be accessed while in the L1 cache or L2 cache and are unlikely to be accessed after being evicted from the L2 cache. If the window size is not smaller than the L2 cache, then the CUMH LRU is used, as indicated at 340.

If the access behavior description is not Loop, MRU, MFU, LRU, LFU, or Stream, then the CUMH LRU is used, as indicated at 342. In other methods, the default CUMH may be an indication of a random cache replacement policy. It is obvious to a person of ordinary skill in the art how to modify the method of FIG. 3 for the situation where there is no L3 cache, or where there are additional, larger caches.

Notes about Other access behaviors and cache usage and management hints

As mentioned above, a repeatable pattern for accessing data may be dynamically captured by profiling. Based on the access pattern, different cache usage and management hints could be specified for sections of the data region. Handling repeatable patterns is not described in the exemplary method of FIG. 3 but may be included in other methods for determining cache usage and management hints.

DETAILED EXAMPLES

While there are many examples of upper software layers 202 and system runtime layers 204, in this example, the upper software layer is a native application and the system runtime layer is included in the operating system. Therefore, page table 218 and CUMH module 230 are part of operating system 224 in this example.

Example A

Stream Access Behavior Description—Disallow CUMH

These examples illustrate how the Stream access behavior description influences the Disallow CUMH that an operating system may send to the processor subsystem. As explained above, the Stream access behavior description includes a metric describing the lifetime of a cache line within the specified memory range. Once this lifetime completes, the cache line will never be accessed again. For this example, assume that the lifetime metric is the estimated data size referenced between the first and last access to a cache line. However, other metrics, such as a time period, could be used instead.

In a first example, assume the native application identifies that a segment of a working set will be accessed using a Stream access pattern and the application estimates 32 KB of memory will be referenced between the first and last access to a cache line. Assume also that the processor's L1, L2 and L3 cache sizes are 64 KB, 1 MB and 16 MB, respectively. The operating system may use this information to determine Disallow cache usage and management hints to send to the processor subsystem. Since the estimated cache line lifetime fits within the 64 KB L1 cache, the default behavior of the processor subsystem to cache the line within the L1 cache is acceptable. However, after the cache line is evicted from the L1 cache, it is likely that the line will never be used again. Therefore, when generating a CUMH, the operating system may specify the Disallow L2&L3 CUMH so that the evicted L1 item will be sent directly to main memory instead of consuming capacity in the L2 cache and the L3 cache.

In a second example, assume that the processor's L1, L2 and L3 cache sizes are 16 KB, 4 MB and 64 MB, respectively. Since the estimate cache line lifetime does not fit within the 16 KB L1 cache, but does fit within the 4 MB L2 cache, the operating system may specify the Disallow L3 CUMH so that the item, once evicted from the L2 cache, will be sent directly to main memory instead of consuming capacity in the L3 cache.

Example B

Loop Access Behavior Description—Direct CUMH

These examples illustrate how the Loop access behavior description influences the Direct CUMH that an operating system may send to the processor subsystem. As explained above, the Loop access behavior description includes a size describing the amount of memory accessed before the loop repeats. Each cache line within the loop is assumed to be accessed only once per iteration.

In a first example, assume the native application identifies that a segment of a working set will be accessed using a Loop access pattern and the application estimates that 2 MB of memory will be referenced within each loop iteration. Assume also that the processor's L1, L2 and L3 cache sizes are 64 KB, 1 MB and 16 MB, respectively. The operating system may use this information to determine what direct CUMH to send to the processor subsystem. Since the loop fits within the L3 cache but not within the L2 cache, the operating system may specify a Direct L3 CUMH. Thus, once each cache line is referenced, it is immediately stored in the L3 cache and bypasses the L1 and L2 caches. The capacity of the L1 and L2 caches remain available to store more localized items.

In a second example, assume that the processor's L1, L2 and L3 cache sizes are 16 KB, 4 MB and 64 MB, respectively. Since the loop fits within the L2 cache but not within the L1 cache, the operating system may specify a Direct L2 CUMH. Thus, once each cache line is referenced, it is immediately stored in the L2 cache and bypasses the L1 cache. The capacity of the L1 cache remains available to store more localized items.

Storage of Cache Usage and Management Hints in the Processor Subsystem

Returning now to FIG. 2, TLB 233 is a cache of mappings from page table 218. The fetching of a new mapping from page table 218 is known as a TLB fill. A TLB fill call 250, which forms part of the interface between system runtime layers 204 and processor subsystem 206, may include an identification of the CUMH for a page being mapped. For cache usage and management hints at the page level, the indication of the CUMH may be stored internally in TLB 233. For example, CUMH values 252 may be stored in TLB 233. Subsequent updates to the page-level CUMH may be provided either using an existing invalidate TLB entry instruction or possibly via a new TLB update call 253, both of which form part of the interface between system runtime layers 204 and processor subsystem 206. It should be noted that this description of TLB 233 is just an example and that other arrangements where the TLB fill process is done entirely in hardware are also contemplated. Other data structures to store cache usage and management hints, whether at the page level or at some other level, are also contemplated.

For cache usage and management hints at the cache-line level, additional new calls (not shown) in the interface between system runtime layers 204 and processor subsystem 206 may be required. The indication of the CUMH may be stored internally in processor 102 or processor subsystem 206 in a separate data structure (not shown).

When the processor accesses memory, the processor reads the cache usage and management hints from TLB 233 or another data structure and stores them in the cache with the accessed item. For example, the processor stores the CUMH values within L1 cache 234 at CUMH values 254, within L2 cache 236 at CUMH values 256, and within L3 cache 238 at CUMH values 258.

Use of Cache Usage and Management Hints in the Processor Subsystem

Eviction of an item from a cache may take into account the CUMH for that item. Consider, for example, an N-way set associative cache. N different items are stored in the same cache set. The items may belong to different working sets and therefore have different cache usage and management hints. When another item is to be stored in the cache set, one of the items currently stored in the cache set needs to be evicted. For these types of conflicts, the OS or other system-level software will specify an arbitration policy. Subsequently, the processor can either implement the policy indicated by software, or execute its own policy.

It should be noted that the Direct and Disallow cache usage and management hints do not affect what cache line of the set is selected for replacement. Rather, the Direct and Disallow cache usage and management hints affect the location of an item when it is first cached (in the case of Disallow L1, L2&L3 and Direct) and when it is being moved from one cache to another (in the case of Disallow L2&L3 and Disallow D3).

Feedback

The technology described thus far may be enhanced through the tracking of cache residency times and/or usage and performance events at the processor subsystem and feedback of the tracked information to the software. The feedback, indicated by an arrow 264, may be provided to system runtime layers 204 and/or to upper software layers 202.

For example, processor 102 may track usage and performance events, such as L1 and L2 cache accesses and cache misses. The usage and performance events may be tracked at any suitable granularity, ranging from cache-line to page to sets of pages. Performance event enable bits stored in an appropriate data structure in the processor subsystem may used to identify for which items events such as cache accesses and cache misses should be profiled. The bits may be determined by the software of the upper layer, or by the system runtime layer, for example, by the operating system. Developers of upper layer software or an operating system may specify profiling in order to understand the cache performance of certain data structures. With tracking at the page granularity, developers may better verify the benefits of data layout optimizations and abstract behavior description changes. For example, if tracking is performed at a per-page granularity, a per-page performance event enable bit 260 stored in TLB 233 determines that an event counter (not shown) should be incremented. Since TLB 233 is usually accessed either in parallel or just prior to determining a cache miss, the performance event enable bits may be stored only in TLB 233 and do not need to be stored within the cache. The per-page performance event enable bit may be passed to processor 102 as part of TLB fill call 250 and TLB update call 253.

In another example, segment granularity tracking may be done by testing whether a particular address falls within some range before an event counter is incremented. Processor subsystem 206 may comprise data segment base and bound registers 262 for enabling tracking of performance events at the segment granularity. The segment base and bound registers may be accessed only on a cache miss and do not need to be stored within the cache.

Processor 102 may track the residency time of cache lines as they move throughout the cache hierarchy. Processors that are commercially available provide a mechanism to accurately trace processor cache usage. If this mechanism were expanded to include cache evictions, and the stored state expanded to include the requested virtual and physical address of the load and store instructions that causes a performance event, as well as a timestamp using the current value of the cycle counter (not shown), then this information could be used by software to determine the lifetime of a cache line by taking the difference of the cache eviction timestamp and the cache miss timestamp.

Fine-grained cache performance data may be used to facilitate dynamic scheduling optimizations. Currently, the default thread scheduling policies strive to balance the thread scheduling load evenly across all processor cores in the system. A thread scheduler may exist in the operating system or the hypervisor as a kernel-thread scheduler or in the upper-layer software as a user-thread/fiber scheduler. The cache locality between different threads has no influence on where threads are scheduled. Thus, threads sharing a significant amount of cached data might be placed on distant cores that do not share any cache capacity. However, by providing feedback to the thread scheduler with detailed cache residency information, the thread scheduler may be able to dynamically determine what data resides within the cache across a fiber/thread/process scheduling quantum. The scheduler may then decide whether sufficient cache locality exists to make cohort scheduling advantageous. Cache locality refers to the amount of cache resident items accessed by multiple fibers/threads/processes. For example, one fiber/thread/process may "warm up" a cache with useful items such that future fibers/threads/processes using that cache encounter fewer cache misses than they would have otherwise. Sufficient cache locality for cohort scheduling means the performance gained by scheduling a fiber/thread/process on a "warmed up" processor cache is greater than the performance gained by scheduling for load balancing.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of cache management in a computer system, the method comprising:

receiving, from an upper layer of software of the computer system, an access behavior description at an intermediary between the upper layer of software and a processor subsystem of the computer system, the access behavior description comprising an indication of how items of a working set are going to be accessed by the upper layer of software when the upper layer of software is executed by the processor subsystem;

determining, by the intermediary, a cache usage management hint based upon a cache configuration of the processor subsystem and the access behavior description specifying a stream access pattern, the cache usage management hint preventing items of the working set from being cached in caches larger than a smallest cache larger than a window corresponding to the stream access pattern; and providing, by the intermediary, the cache usage management hint to the processor subsystem for consideration by the processor subsystem when performing cache management for at least one cache.

2. The method of claim 1 comprising:
   storing the access behavior description and the cache usage management hint internally in the intermediary at a page level.
3. The method of claim 2, storing the access behavior description and the cache usage management hint comprising:
   storing the access behavior description and the cache usage management hint in a page table maintained by an operating system of the computer system.
4. The method of claim 1, providing the cache usage management hint to the processor subsystem comprising:
   providing the cache usage management hint to the processor subsystem as additional information in a translation lookaside buffer fill.
5. The method of claim 1 comprising:
   storing the access behavior description and the cache usage management hint internally in the intermediary at a cache-line level.
6. The method claim 1, the intermediary comprising an operating system and receiving the access behavior description comprising:
   receiving the access behavior description as additional information when requesting that the operating system allocate memory.
7. The method of claim 1, comprising:
   determining the cache usage management hint based upon the access behavior description indicating items of the working set will be accessed by the upper layer of software once, the cache usage management hint specifying the items of the working set are to be stored in memory and not cache.
8. The method of claim 1, comprising:
   determining the cache usage management hint based upon the window being larger than a next-to-largest cache, the cache usage management hint specifying a least recently used cache replacement policy.
9. A processor subsystem comprising:
   at least one processor;
   an intermediary configured to determine a cache usage management hint based upon a cache configuration of the processor subsystem and an access behavior description specifying a stream access pattern of how items of a working set are going to be accessed by an upper layer of software, the cache usage management hint preventing items of the working set from being cached in caches larger than a smallest cache larger than a window corresponding to the stream access pattern;
   one or more caches configured to store items of working sets; and
   a tracking component configured to track performance events within the processor subsystem.
10. The processor subsystem of claim 9, the tracking component configured to:
   provide the upper layer of a software of a computer system with a cache eviction performance event comprising at least one of a physical address and a virtual address of a load or store instruction causing the cache eviction performance event, a timestamp of a cycle counter, a cache eviction timestamp, and a cache miss timestamp.
11. The processor subsystem of claim 9, comprising:
   a data structure to store performance events to enable bits that identify items for which events should be profiled.
12. The processor subsystem of claim 9, the performance events comprising cache accesses.
13. The processor subsystem of claim 9, the performance events comprising cache misses.
14. The processor subsystem of claim 10, the performance events tracked at a cache-line granularity.
15. The processor subsystem of claim 10, the performance events tracked at a set of pages granularity.
16. The processor subsystem of claim 9, the tracking component configured to track residency times of cache lines through the one or more caches.
17. The processor subsystem of claim 9, the tracking component configured to provide a thread scheduler with a cache eviction performance event.
18. A computer readable device comprising computer executable instructions that when executed via a processor on a computer system perform a method comprising:
   receiving, from an upper layer of software of the computer system, an access behavior description at an intermediary between the upper layer of software and a processor subsystem of the computer system, the access behavior description comprising an indication of how items of a working set are going to be accessed by the upper layer of software when the upper layer of software is executed by the processor subsystem;
   determining, by the intermediary, a cache usage management hint based upon a cache configuration of the processor subsystem and the access behavior description specifying a stream access pattern, the cache usage management hint preventing items of the working set from being cached in caches larger than a smallest cache larger than a window corresponding to the stream access pattern; and
   providing, by the intermediary, the cache usage management hint to the processor subsystem for consideration by the processor subsystem when performing cache management for at least one cache.
19. The computer readable device of claim 18, the method comprising:
   determining the cache usage management hint based upon the access behavior description indicating items of the working set will be accessed by the upper layer of software once, the cache usage management hint specifying the items of the working set are to be stored in memory and not cache.
20. The computer readable device of claim 18, the method comprising:
   determining the cache usage management hint based upon the window being larger than a next-to-largest cache, the cache usage management hint specifying a least recently used cache replacement policy.

* * * * *